United States Patent
Munshi

(10) Patent No.: US 7,462,424 B2
(45) Date of Patent: Dec. 9, 2008

(54) PRIMARY THERMAL BATTERIES

(75) Inventor: M. Zafar A. Munshi, Missouri City, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 0 days.

(21) Appl. No.: 11/285,045

(22) Filed: Nov. 21, 2005

(65) Prior Publication Data

US 2006/0073376 A1   Apr. 6, 2006

Related U.S. Application Data

(63) Continuation of application No. 10/142,266, filed on May 9, 2002, now abandoned.

(51) Int. Cl.
*H01M 6/36* (2006.01)
(52) U.S. Cl. .................... 429/231.95; 429/231.8
(58) Field of Classification Search ............. 429/231.8, 429/231.95, 300, 304, 305, 326, 324, 212, 429/218, 112, 231.7, 306, 231.4
See application file for complete search history.

(56) References Cited

U.S. PATENT DOCUMENTS

| | | | | | |
|---|---|---|---|---|---|
| 4,260,667 | A | * | 4/1981 | Miles et al. | 429/112 |
| 4,840,859 | A | * | 6/1989 | Williams et al. | 429/212 |
| 5,175,066 | A | * | 12/1992 | Hamwi et al. | 429/312 |
| 5,916,475 | A | * | 6/1999 | Michot et al. | 252/62.2 |
| 2002/0071987 | A1 | * | 6/2002 | Kezuka et al. | 429/128 |
| 2002/0106558 | A1 | * | 8/2002 | Maske et al. | 429/165 |
| 2004/0063986 | A1 | * | 4/2004 | Wietelmann et al. | 558/290 |

FOREIGN PATENT DOCUMENTS

JP        2000067643  *  3/2000  ................ 8/4

* cited by examiner

*Primary Examiner*—Patrick Ryan
*Assistant Examiner*—Monique Wills

(57) ABSTRACT

A primary reserve thermal battery includes a primarily $CF_x$ cathode, a lithium-based anode, and a solid electrolyte between the cathode and the anode. A high heat source positioned proximate the electrolyte is capable upon activation to heat the electrolyte to a temperature below about 250° C., and more precisely to the melting point of the electrolyte. At that point, the electrolyte undergoes rapid melting and becomes highly conductive, whereupon to cause the battery to produce a burst of power for delivery to an external load.

10 Claims, 1 Drawing Sheet

1,3-di-*tert*-butylimidazolium bis (oxalato) borate

PRIMARY THERMAL BATTERIES

CROSS-REFERENCE TO RELATED APPLICATIONS

This application is a continuation of Ser. No. 10/142,266, filed May 9, 2002 now abandoned, of the same inventor and assignee, and claims the benefits of priority thereof under 35 USC 120.

BACKGROUND OF THE INVENTION

The present invention relates generally to primary lithium batteries, particularly thermal batteries; and more particularly to thermal batteries with higher energy densities, that are lightweight, have higher cell voltages, flatter discharge voltages and operate at lower temperatures than presently available thermal batteries.

Applications that require extremely long shelf-life and a burst of power from milliseconds to a few hours use thermal batteries. Thermal batteries are critical to military aviation, equipment, and weapons systems. Applications include aircrew safety systems, air-to-air missiles, air-to-surface missiles, surface-to-surface missiles, surface-to-air missiles and bombs. These systems require the battery to perform reliably under stringent environmental conditions. The less the weight of the battery, the more working payload or the less propulsion lift requirement; thus, every ounce by which the battery weight is reduced means a concomitant increase in agility and acceleration of the missile. Power per unit weight is the crucial figure of merit, with power per unit volume ruing a close second.

Thermal batteries are non-rechargeable power sources, which use electrolytes of inorganic salts that are solid and considered non-conducting at ambient temperatures. Upon ignition of an internal pyrotechnic heat source, the electrolyte melts and becomes conductive, thereby providing power to an external load. Historically, a large number of military systems have utilized thermal batteries. Today, the accepted industry standard is the lithium or the lithium alloy anode based on Li—Si of which over 1.5 million units have been deployed since 1972. Lithium anode based thermal batteries provide high capacity and capability to withstand high dynamic environments.

Advances in thermal batteries have not been running parallel to advances in consumer electronics or OEM batteries. In fact, today's thermal batteries still use the same operating temperatures as they did twenty years ago and the same type of solid electrolytes; therefore the components for the active electrodes are limited in their choice and performance. Those limitations are attributable to the stringent specifications required of the components of the battery. For instance, the Lithium chloride-potassium chloride (LiCl—KCl) eutectic electrolyte (typically with magnesium oxide (MgO) powder binder) in a thermal battery melts at about 352° C., thereby necessitating a significantly higher decomposition temperature for the electrodes than the eutectic temperature of such electrolyte used in the thermal battery. The melting point of the electrolyte determines the effective operating window for its use in a thermal battery. Because of the high operating temperature of thermal batteries (e.g., 400-600° C.), the cathodes for such batteries must be very high temperature stable materials. Furthermore, these cathodes must be electrochemically and chemically stable with the electrolyte. Unfortunately, very few cathode materials meet these criteria.

The most common cathode materials used for thermal batteries are based on the sulfides of iron and cobalt. $FeS_2$ and $CoS_2$ have decomposition temperatures and voltages of 550° C. and 650° C. and 1.94 V and 1.84 V, respectively. vs. lithium. The lithium-silicon alloy anode has a decomposition temperature of about 702° C. As a result, significant thermal management is required for this system to contain all the heat during the battery operation, significantly reducing the energy density of the battery. The low voltage combined with a low capacity and high temperature requirement leads to poor energy density of between 50-80 Wh/kg.

A two-hour thermal battery requires the use of a molten salt that has a lower melting point and larger liquidus range than the LiCl—KCl eutectic, such as lithium chloride-lithium bromide-potassium bromide (LiCl—LiBr—KBr) eutectic, which melts at 321° C. and has a reasonable liquidus range. Another eutectic that has an even larger liquidus range is lithium bromide-potassium bromide-lithium fluoride (LiBr—KBr—LiF), which melts at 280° C.

Several advanced military applications require thermal batteries capable of providing continuous as well as high power pulsed discharges over extended time periods. This need for operational lives in excess of one hour has necessitated an increase of the heat input to the battery for higher starting temperatures. This allows the electrolyte to remain molten over longer time periods. The higher starting temperature requires active materials that are thermally stable at temperatures close to 600° C. The effect of this evolution not only impacts the active materials, but places increasing importance on overall battery thermal management. Sensors placed inside a nose cone of a missile with the thermal batteries on the outside are more prone to failures at these higher temperatures. More thermal insulations are required to protect these sensors, which in turn leads to heavier missiles. Smaller battery packages, for example, will contain smaller cell stack thermal masses and thinner stack insulations. This puts a considerable strain on the performance of the various components in the cell as well as lowering the. energy density due to the extra insulative packaging required for thermal control.

Currently, most missiles incorporate thermal batteries based on the conventional $FeS_2$ cathode, while some incorporate thermal batteries based on an advanced $CoS_2$ cathode. The advanced systems are pushing the limits of current technology in terms of higher power and energy and longer run times in smaller and lighter packages. However, the result is only an incremental improvement over the $FeS_2$ system. Typical tactical and advanced tactical battery applications are showing a trend towards higher battery voltages, low-to-moderate base discharge rates with high pulse loads, relatively small battery envelopes, and substantially increasing mission times. Conversely, strategic battery requirements tend to require longer mission lives, higher current requirements with steady and/or pulsing loads, larger battery envelopes due to higher power requirements, and may involve maximum skin temperature specifications primarily due to longer mission lives.

A very large number of oxides, because of their refractory properties, have been explored for use as the cathode material, but none to date is believed to have provided a viable system that is highly conductive and thermally stable at the operating temperatures required of these batteries. The materials considered include oxides based on titanium (Ti), vanadium (V), niobium (Nb), chromium (Cr), molybdenum (Mo), tungsten (W), manganese (Mn), iron (Fe), cobalt (Co), nickel (Ni), and copper (Cu). Although desirable attributes were found in many of these oxides, such as high voltages, high energy densities, and good thermal stabilities, many disadvantages were also found, including sloping voltage discharge, inability to utilize full capacity, and oxidation of the halogen-based electrolyte to free halogen by the high voltages.

Some recent reported developments include thin film technologies involving plasma spraying of cathodes and electrolyte components, or tape casting and consolidating all cell layers. Although very high power can be achieved from such designs, the problems of lower energy density and thermal insulation remain, and cost is expected to be higher because of the exotic deposition technique.

As noted above, present thermal batteries operate at very high temperatures (400° C.-600° C.), which is one of their disadvantages. Most of the electrolytes developed so far are based on the halogen derivatives such as LiCl—KCl or LiF—LiCl—LiBr eutectic mixtures or variations of them. However, almost all the electrolytes presently in use or previously proposed for use operate at very high temperatures, thus requiring a cathode with a higher decomposition temperature. Improvements could be made in the energy density and performance characteristics of thermal batteries if a cathode material were found with properties of high capacity per unit weight and volume, thermal stability at high temperatures, high voltage output, very high electronic conductivity, very high thermal conductivity, high reaction kinetics, wide electrochemical stability window, flat voltage with discharge, and, above all, lack of reaction with or oxidation of the electrolyte. The latter is a very important feature that has precluded the use of high voltage cathodes since the common electrolytes are based on the halogen salts, which tend to oxidize to free halogen gases. A wide range of battery chemistries exists today but only a handful may be suitable for use in the development of advanced thermal batteries. Most of the problems are associated with decomposition of the components at the thermal battery temperatures, thermal conductivity, electrochemical instability, or sloping cell voltages.

Clearly, major improvements are needed to reduce the present weight and volume of these batteries in such applications. Future thermal-battery applications envision higher energy densities and lifetimes of up to four hours. The current technology does not meet these requirements, primarily due to limitations of the cathode material.

SUMMARY OF THE INVENTION

The present invention resides in thermal batteries with flatter discharge and higher voltage cathodes than existing iron sulfide or cobalt sulfide, which can increase the energy density and reduce the stringent packaging constraints, in conjunction with a stable electrolyte that is highly conductive and has a high decomposition temperature. One of the principal aims of the invention is to reduce the operating temperature of the thermal battery, preferably to less than 250° C., and more preferably to not greater than 200° C., while increasing its energy density.

The invention utilizes a cathode material—carbon monofluoride ($CF_x$)—that apparently has not previously been evaluated for thermal battery cathodes because of its low thermal stability compared to the iron or cobalt sulfides or oxides. This cathode material has been used in non-aqueous liquid electrolyte batteries since the 1970's with practical energy densities reaching as high as 450-500 Wh/kg. The capacity of this cathode is 864 mAh/g versus 290 mAh/g for $CoS_2$, and exceeds 1.1 volts higher than $CoS_2$. This material offers a flat 3 V discharge with a lithium anode; a theoretical energy density of 2180 Wh/kg; excellent chemical and electrochemical stability; extremely good kinetic properties even upon discharge; its discharge product is carbon, thus maintaining excellent conductivity during discharge unlike most cathode materials that tend to increase in cell resistance; and has thermal stability up to 400° C.

The invention also contemplates combining the $CF_x$ cathode with a stable low cost, low melting point electrolyte, compared to the presently used high temperature eutectics, in the thermal battery. The low temperature molten salt electrolyte combined with the chemically, thermally and electrochemically stable high voltage cathode are key aspects in the improved battery performance provided by the invention. Also, the use of higher voltage and/or bipolar battery design leads to fewer cells being required to manufacture the battery, reduced cell-to-cell interconnections, lower material and manufacturing costs and greater reliability. All of these improvements, in turn, produce a quantum effect in energy density improvement.

The invention may also employ a range of stable electrolytes with lower melting points compared to the high temperature eutectics, for use with this cathode material in a thermal battery.

BRIEF DESCRIPTION OF THE DRAWINGS

The above and other objects, features, aspects and attendant advantages of the invention will be revealed from a consideration of the following detailed description of the best mode presently contemplated for practicing the invention, particularly in conjunction with the accompanying drawings, in which.

DETAILED DESCRIPTION OF THE BEST MODE OF PRACTICING THE INVENTION

Figure 1:
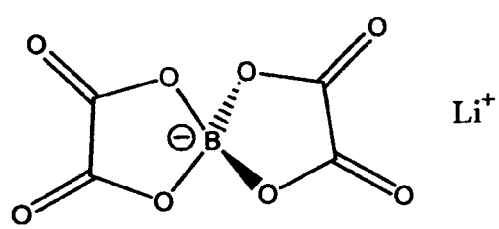
FIG. 1 illustrates the structure of a preferred salt for use as an electrolyte in thermal batteries according to the invention.

A preferred embodiment of a thermal battery according to the invention comprises a cathode composed of carbon monofluoride ($CF_x$) in combination with a halogen-free, highly conductive, molten salt electrolyte based on lithium bis(oxalato)borate ($C_4O_8BLi$) (or LiBOB) salt. The salt has the structure shown in FIG. 1. It demonstrates good chemical and electrochemical stability in contact with lithium. Moreover, it is relatively inexpensive and has a high thermal stability of 302° C. Alternatively, the organoborate salt may be chosen from an aromatic bis[bidentate] borate, also known as a bis[chelato] borate, such as bis[benzenediolato (2-)-O,O'] borate, bis[substituted benzenediolato (2-)-O,O'] borate, bis[salicylato] borate, bis[substituted salicylato] borate, bis[2,2'-biphenyldiolato (O,O')] borate, and bis[substituted 2,2'-biphenyldiolato (O,O')] borate). The aromatic bis[bidentate] borate may be replaced with a nonaromatic bis[chelato] borate, such as bis[oxalato (2-)-O,O'] borate, bis[malonato (2-)-O,O'] borate, bis[succinato] borate, [α-hydroxy-carboxylato] borate, [α-hydroxy-carboxylato] borate, [β-hydroxy-carboxylato] borate, [β-hydroxy-carboxylato] borate, [α-dicarboxylato] borate, and [α-dicarboxylato] borate. If desired, the organoborate may be a mono[bidentate] borate, a tridentate borate, or a tetradentate borate.

The preferred chelated borate anion has a unique tetrahedron structure, in which no acidic hydrogen is present. Electrochemical study indicates this gives the compound a wide electrochemical stability window on platinum electrodes, for example. Further, slow scan cyclic voltammograms showed good compatibility of the salt with graphitizable carbonaceous anode as well as good stability against a charged cathode surface.

Figure 2:
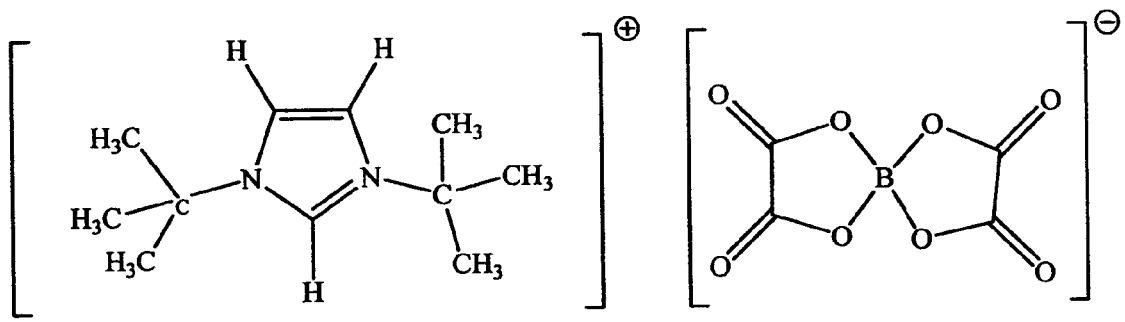
FIG. 2 illustrates the structure of an alternative preferred salt for use as an electrolyte in the thermal batteries.

FIG. 2 illustrates the structure of 1,3-di-tert-butylimidazolium bis (oxalato) borate, an alternative preferred salt.

Use of this lower temperature, highly conductive molten salt electrolyte reduces the amount of thermal insulation required in a thermal battery package, and commensurately reduces weight, volume and cost of the overall battery.

The invention is also directed to combining a $CF_x$ cathode with a lithium or lithium alloy anode and an aforementioned embodiment of the new salt in a thermal battery design to yield energy densities exceeding 150-200 Wh/kg. Here again, the combination should yield a considerable reduction in the thermal insulation required, with concomitant reductions in weight, volume and cost. By manufacturing the components in thinner form than that of existing components in thermal batteries, the power density can be increased.

The use of a standard lithium-silicon alloy anode in the battery design of the invention is preferred; however, graphitic anodes may be used as an alternative that offers improved safety, ease of handling and battery construction, improved chemical and electrochemical stability, lower cost, and higher decomposition temperature, albeit at a slightly lower voltage and capacity. Particular graphitic anodes are based on charged $LiC_6$.

Another embodiment of the invention comprises a solid polymer electrolyte that is ionically conductive. Operating temperatures of many such electrolytes lie in a range between 25° C. and 150° C., which is lower than the molten salt electrolyte. In an attempt to develop all-solid-state rechargeable lithium polymer electrolyte battery, one polymer that has been examined extensively is polyethylene oxide (PEO), which is able to form stable complexes with a number of salts. Because of its low ionic conductivity at ambient temperature of approximately $10^{-9}$ to $10^{-8}$ S/cm, rechargeable batteries examined using this material had to operate at 100° C. and above. A major problem with PEO-based electrolytes at temperatures below 60° C. is their high crystallinity and the associated low ion mobility. In recent years a number of radically different approaches have been taken to improve the conductivity of PEO and PEO-based polymers that have also led to the proposal of other polymers. These approaches included polymer modifications and synthesizing new polymers; random copolymers, block copolymers, comb-branched block copolymer, network structures, and plasticizer salts added to the polymer. Other approaches included forming composite polymers with ceramic materials, using plasticizer salts to increase the ion transport and mobility of the cation, and using plasticizing solvents in the polymer to increase the ionic character of the cation. Several review articles describe these approaches in detail, e.g. "Technology Assessment of Lithium Polymer Electrolyte Secondary Batteries" by M. Z. A. Munshi, Chapter 19 in Handbook of Solid State State Batteries and Capacitors, ed. M. Z. A. Munshi (World Scientific Pub. Singapore) 1995; A. Hooper, M. Gauthier, and A. Belanger, in: "Electrochemical Science and Technology of Polymers—2, Ed R. G. Linford (Elsevier Applied Science, London), 1987.

The block copolymers and comb-branched block copolymers offer conductivities of about $10^{-4}$ to $10^{-5}$ S/cm with standard lithium salts such as $LiClO_4$. The use of plasticizer salts such as lithium bis(trifluoromethane sulfonyl) imide, $LiN(CF_3SO_2)_2$, or lithium methide, $LiC(SO_2CF_3)_3$, can increase the conductivity further by at least half to one order of magnitude, depending on the polymer. Hence, it is possible to increase the ionic conductivity of the polymer electrolytes to $10^{-3}$ to $10^{-4}$ S/cm with some modifications. Inorganic conducting and non-conducting fillers have also been used to increase the ionic conductivity and mechanical property of the polymer. Addition of alpha alumina to $(PEO)_8.LiClO_4$ resulted in a negligible effect on the ionic conductivity but dramatically increased the mechanical property at 100° C., while the addition of other ceramic materials such as ionically conductive beta alumina to PEO—NaI and PEO—$LiClO_4$ complexes improved the ionic conductivity of PEO-based electrolytes to approximately $10^{-5}$ S/cm. By incorporating a polymer electrolyte instead of the solid eutectic, the battery can be made in a thin and flexible form, and in fact can be wrapped around the nose of the missile cone instead of being relegated to a bulky enclosure with considerable insulation. So far as is known, such a battery does not exist for missile or any other applications. Instead of a pyrotechnic device to heat the battery, a thin film flexible heater may be laminated on both sides of the thin film battery. The heater may be operated from an alkaline battery just before launch. It is calculated that the weight and volume of the battery can thereby possibly be reduced down to 10% of that of existing thermal batteries.

A thermal battery incorporating the features of the invention can be readily produced by combining a $CF_x$ cathode with conductive carbon and electrolyte in the ratio of 50-85% $CF_x$, 5-15% electrolyte and 5-15% conductive carbon to form the cathode; an electrolyte consisting of either the organoborate lithium salt or a polymer electrolyte; and an anode comprising either a lithium metal, a lithium alloy, or a lithium ion intercalating carbon electrode. The battery can be heated by any means to liquefy the electrolyte and make it more conductive for reaction to occur.

A thermal battery fabricated according to the present invention possesses the following features:

An emf of >3 V (vs. Li)
Thermally stable to >400° C.
High electronic conductivity cathode
Good kinetics (high rate capability)
Little or no solubility in molten salt electrolytes or polymer electrolytes
Low equivalent weight (high coulombs/mole)
Non-intercalating (multiphase) discharge
Reaction products insoluble in molten salts, with high electronic conductivity and thermal stability
Reasonable cost
Environmentally friendly ("green")

It also provides a thermal battery with significantly lower operating temperatures thereby reducing insulation and higher voltage thereby increasing energy density and power density and lowering cost.

Although certain preferred embodiments and methods have been described in conjunction with presenting the best mode of practicing the invention, it will be recognized by those skilled in the art from a consideration of the foregoing description that variations and modifications may be implemented without departing from the true spirit and scope of the invention. Accordingly, it is intended that the invention shall not be limited except as set forth in the following claims and by the rules and practices of the relevant patent laws.

What is claimed is:

1. A primary reserve thermal battery comprising:
   a primarily carbon monofluoride ($CF_x$) cathode,
   an anode having a lithium-based composition,
   a solid electrolyte having a composition that is thermally stable in a temperature range below 250° C., interposed between said cathode and said anode,
   a heat source within said battery and proximate said electrolyte, said heat source configured to heat said electrolyte to its melting point temperature to render said electrolyte sufficiently conductive for operation of said battery to produce a burst of power therefrom for delivery to an external load, the primary reserve thermal battery configured to delivery power to the external load at operating temperatures below 250° C.

2. The thermal battery of claim 1, wherein the cathode includes $CF_x$, conductive carbon and electrolyte in the ratio of 50-85% $CF_x$, 5-51% conductive carbon, and 5-15% electrolyte.

3. The thermal battery of claim 1, wherein the electrolyte comprises an organoborate lithium salt.

4. The thermal battery of claim 1, wherein the solid electrolyte includes an ionic ally conductive polymer.

5. The thermal battery of claim 1, wherein the anode is a lithium alloy.

6. The thermal battery of claim 5, wherein the anode is a lithium-silicon alloy.

7. The thermal battery of claim 1, wherein the anode is a lithium ion intercalating carbon electrode comprising $LiC_6$.

8. The thermal battery of claim 4, wherein the polymer is polyethylene oxide (PEO) based.

9. A primary reserve thermal battery comprising:
a primarily carbon monofluoride ($CF_x$) cathode,
an anode having a lithium-based composition,
a solid electrolyte having a composition that is thermally stable in a temperature range below about 250° C., interposed between said cathode and said anode,
a heat source within said battery and proximate said electrolyte, said heat source configured to heat said electrolyte to its melting point temperature to render said electrolyte sufficiently conductive for operation of said battery to produce a burst of power therefrom for delivery to an external load,
thin film heating elements to heat the battery,
the primary reserve thermal battery configured to delivery power to the external load at operating temperatures below about 250° C.

10. The thermal battery of claim 1, wherein the components of the battery are structured to render the battery flexible.

* * * * *